United States Patent
Hayashi et al.

(10) Patent No.: US 7,130,928 B2
(45) Date of Patent: Oct. 31, 2006

(54) METHOD AND APPARATUS FOR MANAGING I/O PATHS ON A STORAGE NETWORK

(75) Inventors: Takahiro Hayashi, Yokohama (JP); Hiroshi Morishima, Yokohama (JP); Osamu Kohama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 10/903,651

(22) Filed: Jul. 29, 2004

(65) Prior Publication Data

US 2005/0251548 A1    Nov. 10, 2005

(30) Foreign Application Priority Data

May 7, 2004    (JP) .............................. 2004-138691

(51) Int. Cl.
*G06F 3/00* (2006.01)

(52) U.S. Cl. .............................. 710/8; 710/36; 710/38; 709/238; 709/239; 709/240; 709/241

(58) Field of Classification Search ..................... None
See application file for complete search history.

(56) References Cited

U.S. PATENT DOCUMENTS

| | | | |
|---|---|---|---|
| 6,145,028 A | 11/2000 | Shank et al. | |
| 6,216,202 B1 | 4/2001 | D'Errico | |
| 6,738,839 B1 | 5/2004 | Sinha | |
| 6,766,359 B1 | 7/2004 | Oliveira et al. | |
| 6,883,108 B1 | 4/2005 | Lee et al. | |
| 2004/0128363 A1* | 7/2004 | Yamagami et al. | 709/217 |

* cited by examiner

Primary Examiner—Fritz Fleming
Assistant Examiner—Niketa I. Patel
(74) Attorney, Agent, or Firm—Townsend and Townsend and Crew LLP

(57) ABSTRACT

A processing apparatus which stores a first information piece about attributes identifying a specific process generating data input/output requests in such a manner that the first information piece is associated with a second information piece identifying at least one of the physical paths as at least one first physical path, and which, when transmitting first data input/output requests generated by the process identified by the first information piece to the storage apparatus, transmits the first data input/output requests to the storage apparatus via the first physical path identified by the second information piece associated with the first information piece and, when transmitting second data input/output requests generated by a process not identified by the first information piece to the storage apparatus, transmits the second data input/output requests to the storage apparatus via at least one second physical path different from the first physical path of the plurality of physical paths.

9 Claims, 18 Drawing Sheets

PATH LIST TABLE

| LOGICAL PATH ID | PROCESSING APPARATUS SIDE I/F | STORAGE APPARATUS SIDE I/F | STATUS |
|---|---|---|---|
| 1 | HBA 1 | I/F 1 | OK |
| 2 | HBA 2 | I/F 2 | OK |
| 3 | HBA 3 | I/F 3 | OK |
| 4 | HBA 4 | I/F 4 | OK |
| ⋮ | ⋮ | ⋮ | ⋮ |
| 20 | HBA 20 | I/F 20 | OK |

PREFERENTIAL PATH
PROPORTION TABLE          730

| PREFERENTIAL PATHS | NORMAL PATHS |
|---|---|
| 10 | 10 |

FIG. 8

PROCESS PRIORITY TABLE          710

| PROCESS INFORMATION | PRIORITY |
|---|---|
| A | 5 |
| B | 3 |
| C | 2 |

FIG. 9

SETTING OF PREFERENTIAL PATHS

PROPORTION OF PREFERENTIAL PATHS INPUT

| PREFERENTIAL PATHS | NORMAL PATHS |
|---|---|
| 10 | 10 |

PREFERENTIAL CONDITIONS
(PROCESS INFORMATION) INPUT

| PROCESS INFORMATION | PRIORITY |
|---|---|
| A | 5 |
| B | 3 |
| C | 2 |

OK    Cancel

FIG. 10

| PROCESS INFORMATION | |
|---|---|
| ☑ APPLICATION PROGRAM | DATABASE SOFTWARE A ▼ <br> WORD PROCESSING SOFTWARE B <br> SPREADSHEET SOFTWARE C <br> ... |
| ☐ OWNER OF THE PROCESS | User A ▼ <br> User B <br> ... |
| ☐ GROUP OF THE OWNER OF THE PROCESS | grp A ▼ <br> grp B <br> ... |
| ☐ PRIORITY OF THE PROCESS | 25  OR ABOVE |
| ☐ TERMINAL THAT HAS STARTED THE PROCESS | tty1 ▼ <br> ... |
| ☐ MEMORY USAGE OF THE PROCESS | 10  MB OR ABOVE |
| ☐ DIRECTORY WHERE THE PROCESS HAS BEEN STARTED | /usr/local/bin |
| ☐ CPU UTILIZATION OF THE PROCESS | 25  % OR ABOVE |

[ OK ]  [ Cancel ]

FIG. 11

PATH LIST TABLE 700

| LOGICAL PATH ID | PROCESSING APPARATUS SIDE I/F | STORAGE APPARATUS SIDE I/F | STATUS |
|---|---|---|---|
| 1 | HBA 1 | I/F 1 | OK |
| 2 | HBA 1 | I/F 2 | OK |
| 3 | HBA 1 | I/F 3 | OK |
| 4 | HBA 2 | I/F 1 | OK |
| 5 | HBA 2 | I/F 2 | OK |
| 6 | HBA 2 | I/F 3 | OK |

FIG. 20

PRIORITY MANAGEMENT TABLE 720

| PROCESSNG APPARATUS SIDE ID | STORAGE APPARATUS SIDE I/F | PREFERRED PROCESS INFORMATION | PATH OCCUPATION FLAG |
|---|---|---|---|
| HBA 1 | I/F 1 | A | 1 |
| | | | |

FIG. 21

METHOD AND APPARATUS FOR MANAGING I/O PATHS ON A STORAGE NETWORK

CROSS-REFERENCE TO RELATED APPLICATIONS

The present application claims priority upon Japanese Patent Application No. 2004-138691 filed on May 7, 2004, which is herein incorporated by reference.

BACKGROUND OF THE INVENTION

1. Field of the Invention

The present invention relates to a processing apparatus, a processing apparatus control method and a program.

2. Description of the Related Art

In recent years, as information technology has advanced, technology has been being developed which is intended to improve input/output performances and reliabilities by connecting a processing apparatus and a storage apparatus with a plurality of input/output paths. See, for example, U.S. Pat. No. 6,526,521.

In the case where a processing apparatus and a storage apparatus are connected with a plurality of input/output paths, the processing apparatus selects one of the plurality of input/output paths to transmit a data input/output request to a storage apparatus. The selection of an input/output path is performed according to a round-robin scheme in which an input/output path is selected sequentially from the input/output paths, taking load dispersion into account.

SUMMARY OF THE INVENTION

Meanwhile, various application programs are executed on the processing apparatus. While these application programs, when executed, are managed as processes by an operating system, data input/output requests generated by the processes are not of the same type, but some of the data input/output requests may desirably be transmitted preferentially to the storage apparatus, while the others may not preferentially, depending on the attributes of the process.

Hence, there is desired a technology that selects an input/output path, taking the attributes of the process into account and transmits its data input/output request to a storage apparatus.

The present invention was made in view of the above problem, and a main object thereof is to provide a processing apparatus, a processing apparatus control method and a program.

In order to solve the above problem, according to the present invention, there is provided a processing apparatus which is coupled to a storage apparatus via a plurality of physical paths as transmission paths for a plurality of data input/output requests to be transmitted to the storage apparatus and associated with the execution of an application program managed as a process by an operating system, the processing apparatus comprising a CPU; a memory; an association storage section implemented by the CPU executing a program stored in the memory; and a transmission controller implemented by the CPU executing a program stored in the memory, wherein the association storage section stores a first information piece about attributes identifying a specific process generating data input/output requests in such a manner that the first information piece is associated with a second information piece identifying at least one of the physical paths as at least one first physical path, and wherein when transmitting first data input/output requests generated by the process identified by the first information piece to the storage apparatus, the transmission controller transmits the first data input/output requests to the storage apparatus via the first physical path identified by the second information piece associated with the first information piece and, when transmitting second data input/output requests generated by a process not identified by the first information piece to the storage apparatus, transmits the second data input/output requests to the storage apparatus via at least one second physical path different from the first physical path of the plurality of physical paths.

Features and objects of the present invention other than the above will become clear by reading the description of the present specification with reference to the accompanying drawings.

According to the present invention there is provided the processing apparatus, a processing apparatus control method and a program.

BRIEF DESCRIPTION OF THE DRAWINGS

For a more complete understanding of the present invention and the advantages thereof, reference is now made to the following description taken in conjunction with the accompanying drawings wherein:

FIG. 8 is a view showing a preferential path proportion table according to the embodiment;

FIG. 9 is a view showing a process priority table according to the embodiment;

FIG. 10 is a view showing a screen for setting preferential paths according to the embodiment;

FIG. 11 is a view showing a screen for setting process information according to the embodiment;

FIG. 20 is a view showing a path list table according to the embodiment;

FIG. 21 is a view showing a priority management table according to the embodiment;

DETAILED DESCRIPTION OF THE PREFERRED EMBODIMENTS

At least the following matters will be made clear by the explanation in the present specification and the description of the accompanying drawings.

Example of the Entire Configuration

Figure 1:
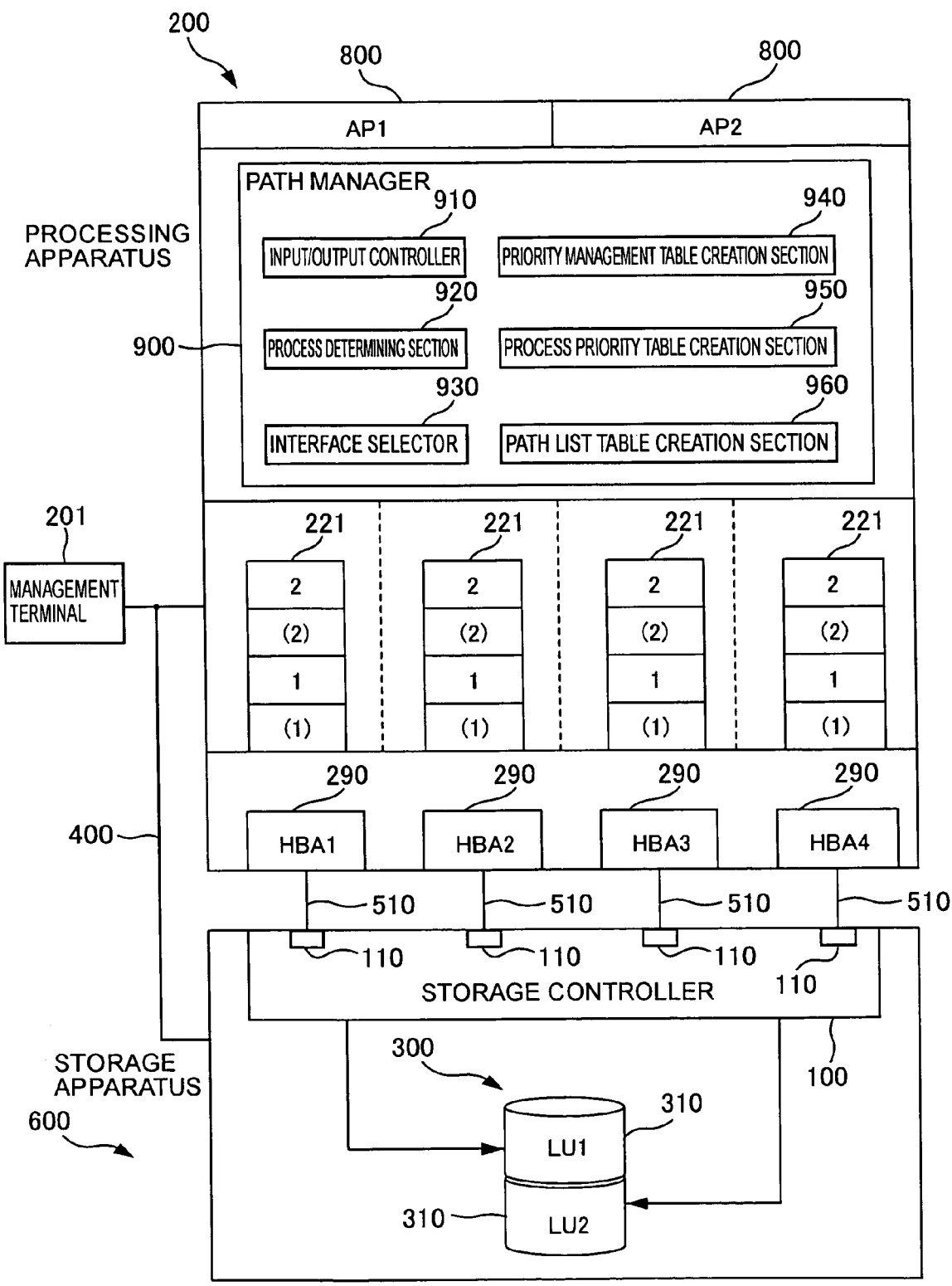
FIG. 1 is a block diagram showing the configuration of a processing apparatus and a storage apparatus according to an embodiment of the present invention.
Figure 2:
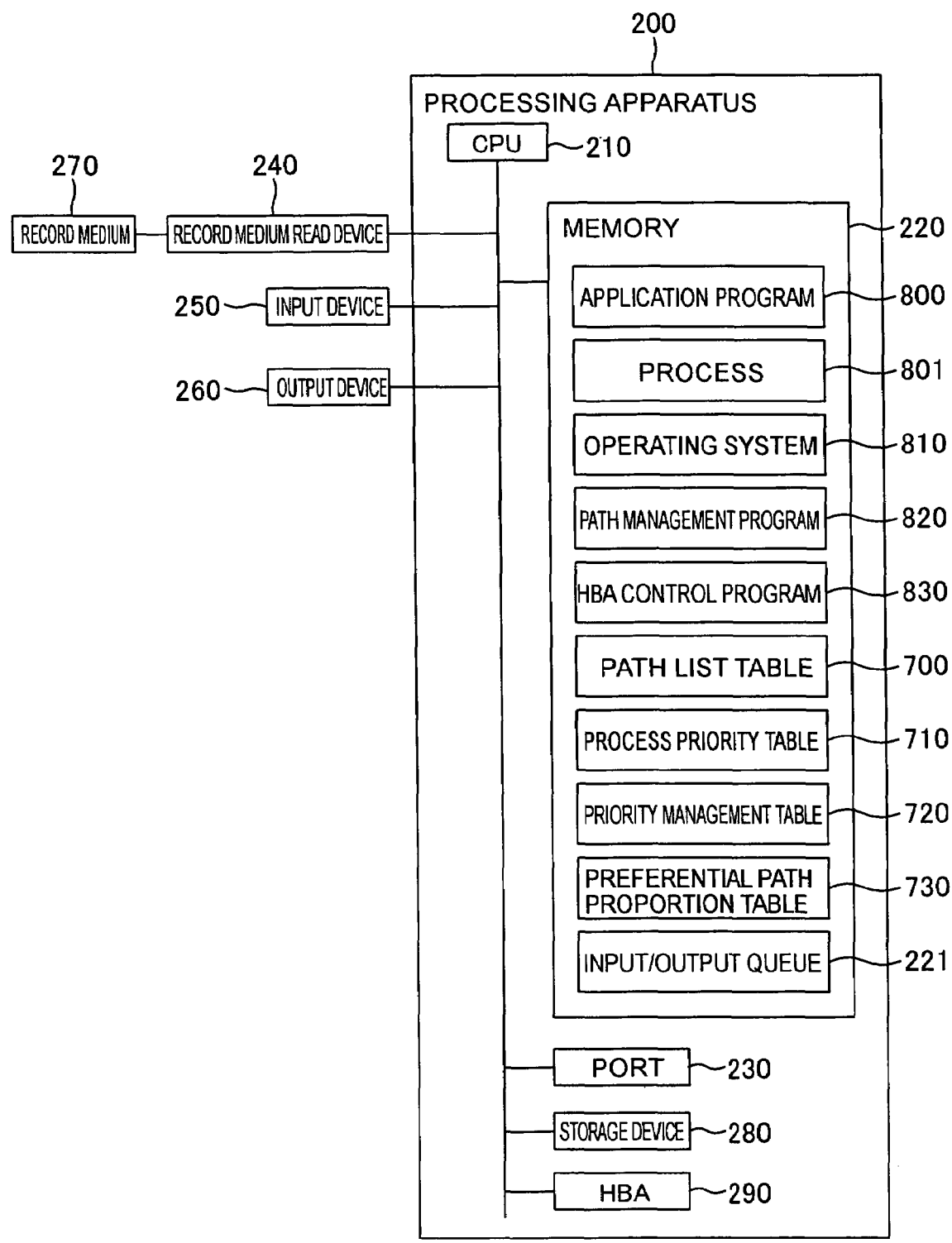
FIG. 2 is a block diagram showing the configuration of the processing apparatus according to the embodiment.

In FIG. 1, there is shown a block diagram for explaining the operation of a processing apparatus 200 according to the present embodiment. Furthermore, in FIG. 2, there is shown a block diagram illustrating the configuration of the processing apparatus 200.

The processing apparatus 200 according to the present embodiment is an information apparatus comprising a CPU (Central Processing Unit) 210 and a memory 220, and executes various application programs 800. In FIG. 1, two application programs 800, i.e. AP1 (800) and AP2 (800), are shown. The application programs 800 may be, for example, an automatic deposit disbursement system for a bank and a seat reservation system for airplanes.

The application program 800, when executed, is managed as a process 801 by an operating system 810. The process 801 generates data input/output requests due to the execution of the application program 800. The data input/output requests are transmitted via a plurality of physical paths connecting the processing apparatus 200 and a storage apparatus 600 from the processing apparatus 200 to the storage apparatus 600. The physical paths are a transmission path for data input/output requests physically configured by hardware in order to transfer data between the processing apparatus 200 and the storage apparatus 600. Four communication cables 510 connect the processing apparatus 200 and the storage apparatus 600, each of which constitutes such a physical path. Furthermore, HBA. (Host Bus Adapter, a first communication port) 1 (290) to HBA 4 (290) are communication interfaces between the processing apparatus 200 and the storage apparatus 600, and together with the communication cables 510 constitute physical paths respectively.

A path manager 900 controls transmission of data input/output requests via the above physical paths. That is, in the case where the processing apparatus 200 and the storage apparatus 600 are coupled with a plurality of physical paths as in the present embodiment, the path manager 900 transmits a plurality of data input/output requests generated by the processes 801 to the storage apparatus 600 with assigning the requests to the physical paths. The assigning is performed by registering data input/output requests in an input/output queue 221 provided for each physical path in the memory 220. The example shown in FIG. 1 illustrates that four data input/output requests "1", "2", "(1)", and "(2)" are each divided into parts of a predetermined data-length (in the example of FIG. 1, each divided into four), which are registered in the input/output queues 221. Here, the data input/output requests indicated by "1", "2" have been generated by process AP1 (800) and the data input/output requests indicated by "(1)", "(2)" have been generated by process AP2 (800).

The data input/output requests registered in the input/output queue 221 are sequentially transmitted to the storage apparatus 600 via the HBA 290 and the communication cable 510.

Note that the path manager 900 comprises an input/output controller 910, a process determining section 920, an interface selector 930, a priority management table creation section 940, a process priority table creation section 950, and a path list table creation section 960, which will be described later.

Storage Apparatus

The storage apparatus 600 is an apparatus for storing data. The storage apparatus 600 comprises storage volumes 310 and reads and writes data from and into the storage volumes 310 in response to data input/output requests transmitted from the processing apparatus 200. The storage volume 310 is a storage area including a physical volume that is a physical storage area provided by a hard disk apparatus and the like, and a logical volume that is a storage area logically set on the physical volume. In FIG. 1, two storage volumes 310 marked as LU1 and LU2 are shown. A storage controller 100 communicates with the processing apparatus 200 and reads and writes data from and into the storage volume 310 in response to data input/output requests transmitted from the processing apparatus 200. Communication with the processing apparatus 200 is performed via an interface controller 110 (a second communication port, hereinafter also called an IF). The interface controller 110 together with HBA 290 and communication cable 510 constitutes a physical path.

Note that the storage apparatus 600 may be constituted as a disk array apparatus having a plurality of hard disk apparatuses. In this case, a storage area provided for the processing apparatus 200 may be configured to be provided by the plurality of hard disk apparatuses managed according to a RAID (Redundant Arrays of Inexpensive Disks) scheme.

Management Terminal

A management terminal 201 is an information unit for performing various settings for the processing apparatus 200 and the storage apparatus 600. For example, changes in the settings of the input/output queue 221 and the HBA 290 when increasing the number of the above physical paths, and changes in the settings of the storage controller 100 when adding more storage volumes 310 are performed through the management terminal 201. Needless to say, these settings can also be performed directly by the processing apparatus 200 and the storage apparatus 600 without using the management terminal 201.

The management terminal 201 is connected to the processing apparatus 200 and the storage apparatus 600 via a LAN (Local Area Network) 400 so as to be able to communicate therewith. The LAN 400 may be embodied as a public network such as the Internet or a private network. Moreover, the LAN 400 may have a plurality of management terminals 201 connected thereto or other processing apparatuses 200 and storage apparatuses 600 connected thereto.

Processing Apparatus

The processing apparatus 200 comprises a CPU 210, a memory 220, a port 230, a record medium read device 240, an input device 250, an output device 260, a storage device 280, and the HBAs 290.

The CPU 210 controls the entire processing apparatus 200 and, by executing the application programs 800 stored in the memory 220, provides various information processing services such as an automatic deposit disbursement system for a bank and a seat reservation system for airplanes mentioned above. Furthermore, the CPU 210 executes an operating system (hereinafter called an OS) 810 stored in the memory 220 and made up of codes for performing various operations associated with the present embodiment, a path management program 820, and an HBA control program 830. Realized by the CPU 210 executing the operating system 810, the path management program 820, and the HBA control program 830 are an association storage section, a transmission control section, a physical path proportion storage section, and the path manager 900 shown in FIG. 1. Moreover, as described above, the application program 800, when executed, is managed as a process 801 by the operating system 810.

The memory 220 has a path list table 700, a process priority table 710, a priority management table 720, and a preferential path proportion table 730 stored therein, which will be described later. Note that the operating system 810, the path management program 820, and the HBA control program 830 may be individual programs, or at least part of these programs may be configured as one program, or each program may be made up of a plurality of programs.

The record medium read device 240 is a device for reading out programs and data recorded on a record medium 270. The read-out programs and data are stored into the memory 220 or the storage device 280. Thus, the operating system 810, the path management program 820, and the HBA control program 830 recorded on the record medium 270 can be read out from the record medium 0.270 by use of the record medium read device 240 and stored in the memory 220 or the storage device 280. A flexible disc, a magnetic tape, a CD-ROM, a semiconductor memory and the like can be used as the record medium 270. In its embodiment, the record medium read device 240 may be incorporated in the processing apparatus 200, or externally attached thereto. The storage device 280 may be, for example, a hard disk apparatus, a semiconductor memory device or the like. The operating system 810, the path management program 820, the HBA control program 830, the path list table 700, the process priority table 710, the priority management table 720, and the preferential path proportion table 730 may be enabled to be stored in the storage device 280.

The input device 250 is a device used for an operator and the like to input data and the like to the processing apparatus 200 and functions as a user interface. For example, a keyboard, a mouse, or the like can be used as the input device 250. The output device 260 is a device used to output information to the outside and functions as a user interface. For example, a display, a printer, or the like can be used as the output device 260.

The port 230 is a device for communication. Communication with the management terminal 201 via, for example, the LAN 400 can be enabled to be performed via the port 230. In this case, the operating system 810, the path management program 820, and the HBA control program 830 can be received via the port 230 from the management terminal 201 or another processing apparatus 200 and stored in the memory 220 or the storage device 280.

The HBA 290 is a device for transmitting and receiving data between the processing apparatus 200 and the storage apparatus 600. The processing apparatus 200 transmits a data input/output request to the storage apparatus 600 via the HBA 290. Note that in its embodiment, the HBA 290 may be incorporated in the processing apparatus 200, or externally attached thereto.

Note that although the configuration of the management terminal 201 is not shown, the management terminal 201 comprises a CPU, a memory, a port, a record medium read device, an input device, an output device, and a storage device as the processing apparatus 200 does. The setting of the processing apparatus 200 and the storage apparatus 600 by use of the management terminal 201 may be enabled to be performed through various setting windows displayed on the output device provided in the management terminal 201.

Characteristic of Data Input/Output Requests

Figure 3:
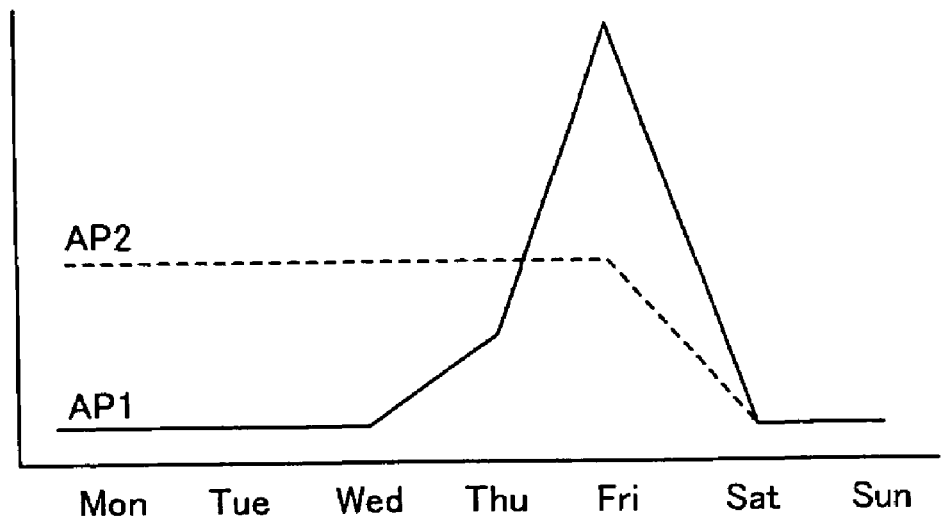
FIG. 3 is a view showing a data input/output request characteristic according to the embodiment.

FIG. 3 is a view showing an input/output characteristic of AP1 (800) and AP2 (800) executed in the processing apparatus 200 according to the present embodiment. In FIG. 3, the abscissa representing a day of the week and the ordinate representing the number of data input/output request times, the number of data input/output request times of each of AP1 (800) and AP2 (800) is represented as a graph.

As shown in FIG. 3, there is a big difference in the characteristic of data access to the storage apparatus 600 between AP1 (800) and AP2 (800). That is, AP1 (800) has a characteristic that the number of data input/output request times increases at a specific time period (Friday), while AP2 (800) has a characteristic that the number of data input/output request times is relatively constant.

Note that data input/output requests associated with the execution of AP1 (800) and AP2 (800) both share the four physical paths.

Here, when the process performed by AP2 (800) has a high priority, that is, when the process is required to be quickly processed with little wait time like, for example, the automatic deposit disbursement system for a bank, if data input/output requests associated with the execution of AP1 (800) and AP2 (800) are evenly assigned to each physical path, it will cause a bottleneck that the four physical paths are shared by AP1 (800) and AP2 (800), and hence, the data input/output processes performed by AP2 (800) are likely to be disrupted on Fridays when the number of data input/output request times from AP2 (800) increases.

Figure 4:
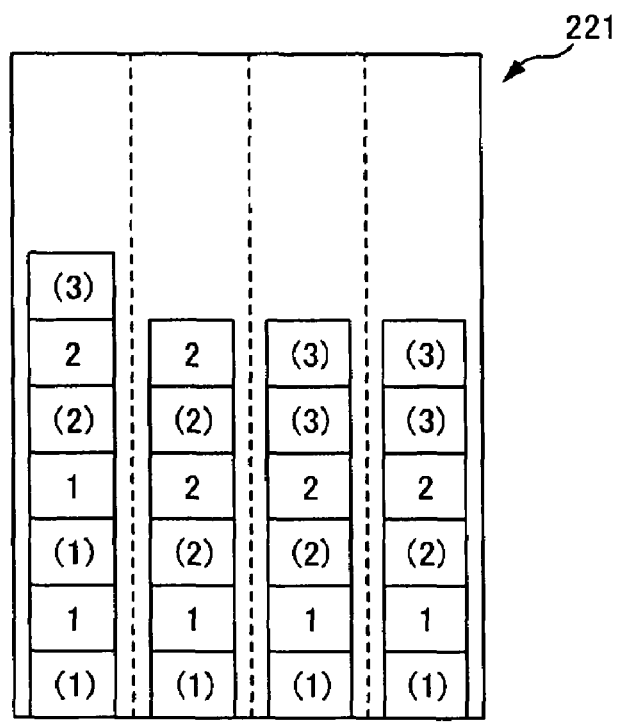
FIG. 4 is a view showing a state of an input/output queue according to the embodiment.

In FIG. 4, there is shown a state where data input/output requests from AP1 (800) and AP2 (800) are evenly assigned by the path manager 900 to the four physical paths. It is shown in FIG. 4 that Data input/output requests (1, 2, (1), (2), (3)) from AP1 (800) and AP2 (800) are each divided into five parts of a predetermined data length, and those parts are then evenly assigned to the four input/output queues 221.

In this case, although the data input/output processes ((1), (2), (3)) generated from AP2 (800) should be performed quickly, as a result of assigning evenly them and the data input/output processes (1, 2) from AP1 (800), the data input/output processes from AP2 (800) are delayed.

Accordingly, it is desired that transmission of data input/output requests from the processing apparatus 200 to the storage apparatus 600 be performed taking into account the characteristic of the application program 800. In addition to the characteristic of the application program 800, there is desired the transmission of data input/output requests taking into account the attributes of the process 801 such as the owner of the process, the group that the owner belongs to, the priority of the process, the terminal that has started the process, the memory usage of the process, the directory in which the process has been started, and the CPU utilization of the process as well.

Process of Preferentially Assigning of Paths

Figure 5:
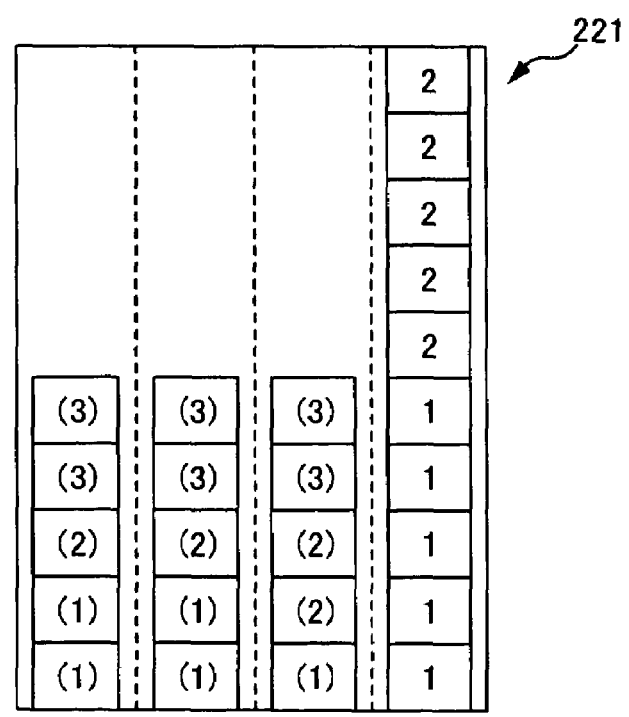
FIG. 5 is a view showing a state of an input/output queue according to the embodiment.

In FIG. 5, there is shown a state of the input/output queues 221 where preferential assignment of paths has been performed taking into account the attributes of the process 801, in the processing apparatus 200 according to the present embodiment. The preferential assignment of paths is performed by the interface selector 930 of the path manager 900 assigning data input/output requests to each path in such a way that specific data input/output requests having a high priority occupy designated physical paths.

In FIG. 5, data input/output requests ((1), (2), (3)) from AP2 (800) have been assigned so as to occupy three physical paths. Other data input/output requests, i.e., data input/output requests from application programs 800 other than AP2 (800) have been assigned to the other physical path.

By preferentially assigning the paths in this manner when transmitting data input/output requests from AP2 (800), the data input/output requests from AP2 (800) can be transmitted without being affected by the other data input/output requests.

Preferential Assignment of Paths

The process of preferential assignment of paths executed in the processing apparatus 200 according to the present embodiment will be described sequentially below.

Path List Table

First, a path list table 700 will be explained with reference to FIG. 6. The path list table 700 is a table describing a list of logical paths between the processing apparatus 200 and the storage apparatus 600. The logical paths are transmission paths logically set on the physical paths between the processing apparatus 200 and the storage-apparatus 600. The logical paths are identified by the HBA 290 of the processing apparatus 200 and the interface controller 110 of the storage apparatus 600.

Figures 6, 7:
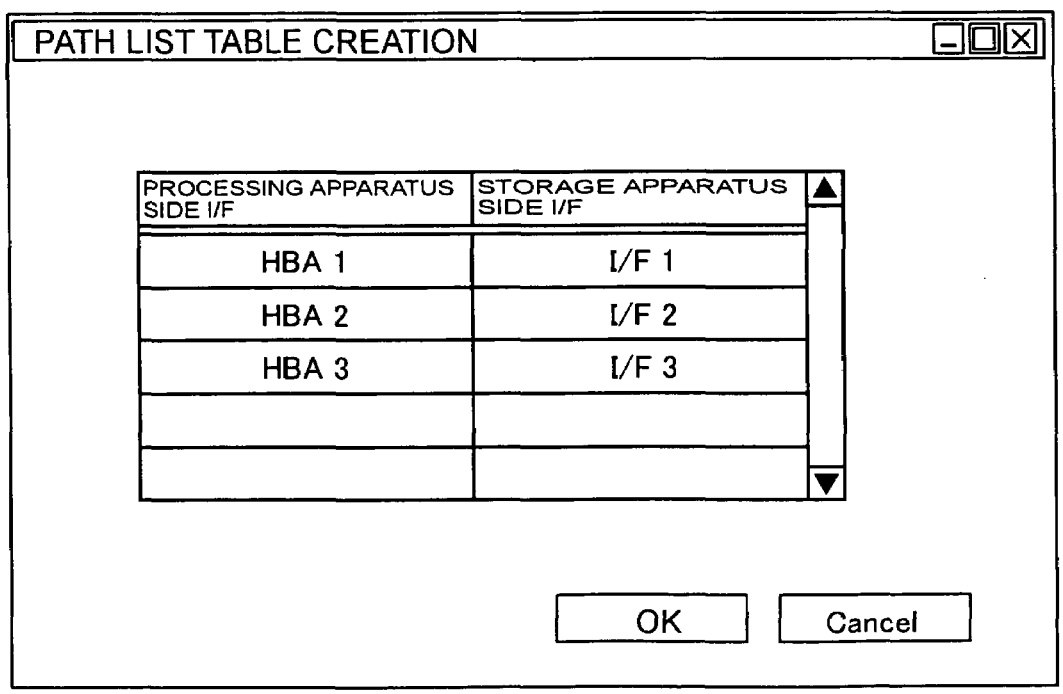
FIG. 6 is a view showing a path list table according to the embodiment.
FIG. 7 is a view showing a screen for creating the path list table according to the embodiment.
Figure 12:
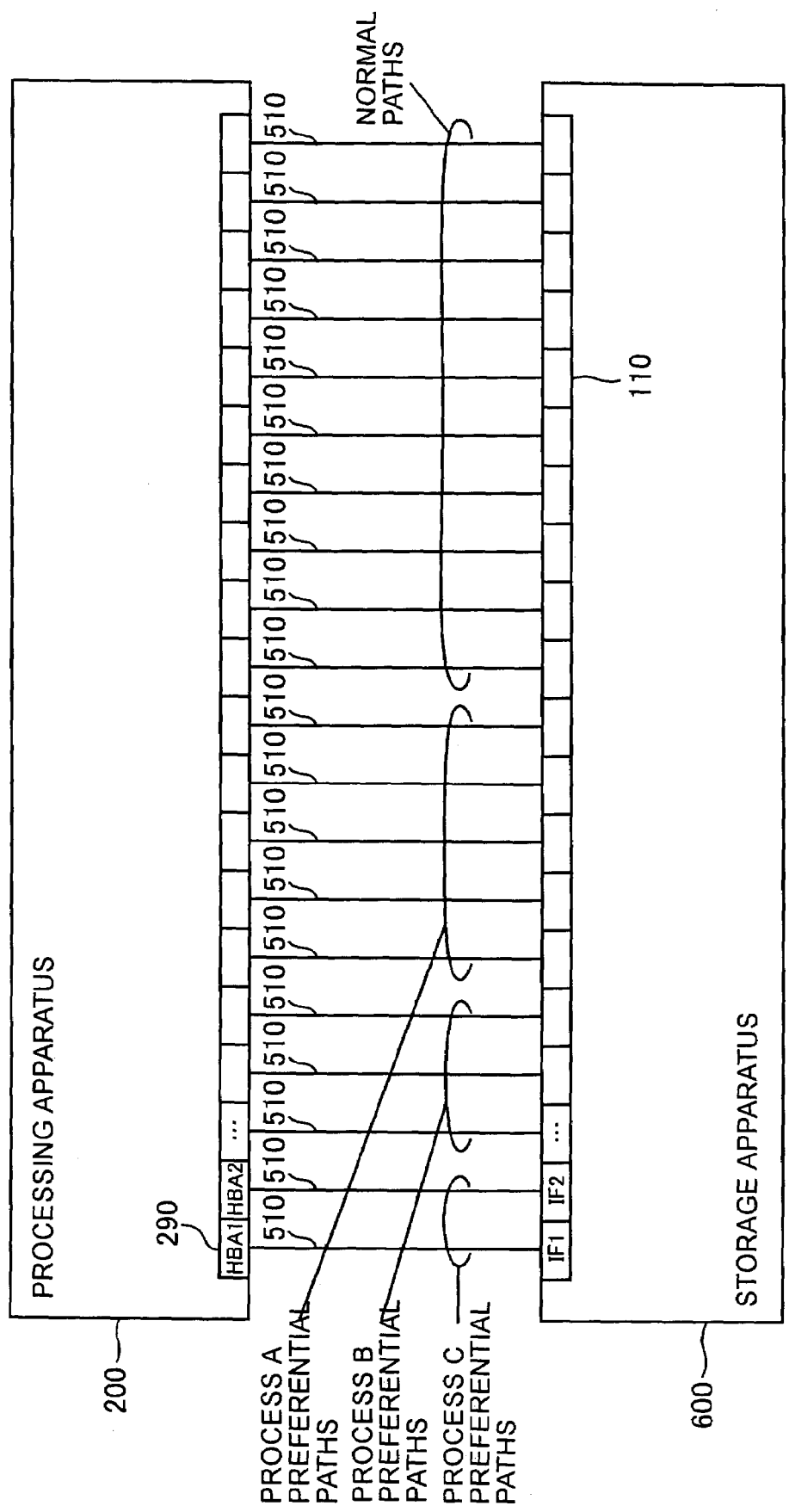
FIG. 12 is a view showing a state of paths according to the embodiment.

An example shown in FIG. 6 illustrates a list of the logical paths for the case where the processing apparatus 200 and the storage apparatus 600 are connected as shown in FIG. 12. That is, for the case where, as shown in FIG. 12, twenty HBAs 290, HBA1 (290) to HBA20 (290), being provided in the processing apparatus 200, twenty interface controllers 110, IF1 (110) to IF20 (110), being provided in the storage apparatus 600, each HBA 290 and a respective interface controller 110 are connected one-on-one with a communication cable 510, there is shown a list of logical paths that are the communication paths between the processing apparatus 200 and the storage apparatus 600.

Note that the status column of the path list table 700 is a column in which the status of each logical path is described. When "OK" is written, it indicates that communication via the logical path between the processing apparatus 200 and the storage apparatus 600 is possible. When "NG" is written, it indicates that communication via the logical path is impossible. The status column of the path list table 700 is updated according to the state of the logical path by, for example, the operating system 810.

The setting of the path list table 700 can be performed through a "path list table creation" screen displayed on a display device provided in the processing apparatus 200 and the management terminal 201. An operator, by entering identifications of HBA 290 of the processing apparatus 200 and the interface controller 110 of the storage apparatus 600 into the "path list table creation" screen and clicking the mouse with the cursor being on the "OK" button, can set the path list table 700.

The path list table creation section 960 performs control such as the display of the "path list table creation" screen and the creation of the path list table 700 based on the identification information of HBA 290 of the processing apparatus 200 and the interface controller 110 of the storage apparatus 600 entered by an operator or the like.

Note that in the case where, as shown in FIG. 12, the processing apparatus 200 and the storage apparatus 600 are directly connected with the communication cables 510, the logical path matches a physical path, that is, one logical path corresponds to one physical path. However, for example, when the processing apparatus 200 and the storage apparatus 600 are connected via a switch, the logical path may not match a physical path, which will be explained later in detail.

Preferential Path Proportion Table

Next, the preferential path proportion table 730 will be described with reference to FIG. 8. The preferential path proportion table 730 is a table that stores the proportion of the number of physical paths to be used as physical paths (first physical paths or preferential paths) occupied when transmitting data input/output requests (first data input/output requests) generated by a process identified by process information described later (first information about attributes for identifying a process 801 generating data input/output requests) to the number of physical paths to be used as physical paths (second physical paths or normal paths) for transmitting data input/output requests (second data input/output requests) generated by a process not identified by the process information. In an example shown in FIG. 8, it is shown that the proportion is of ten preferential paths to ten normal paths. In the configuration shown in FIG. 12, because there are a total of twenty physical paths, the numbers of preferential paths and normal paths are each ten.

Process Priority Table

Next, the process priority table 710 will be explained with reference to FIG. 9. The process priority table 710 is a table for storing process information in such a way that each process information piece is associated with the number of preferential paths (priority). In an example shown in FIG. 9, it is shown that the number of physical paths occupied when transmitting data input/output requests generated by a process identified by process information A is five, that the number of physical paths occupied when transmitting data input/output requests generated by a process identified by process information B is three, and that the number of physical paths occupied when transmitting data input/output requests generated by a process identified by process information C is two. That state is shown in FIG. 12.

The setting of the preferential path proportion table 730 and the process priority table 710, as shown in FIG. 10, can be performed through a "setting of preferential paths" screen displayed on a display device provided in the processing apparatus 200 and the management terminal 201. An operator can set the preferential path proportion table 730 and the process priority table 710 by entering given input into each of the preferential path proportion input column and the preferential conditions (process information piece) input column of the "setting of preferential paths" screen, and clicks the mouse with the cursor being on the "OK" button.

Note that the contents of each process information piece can be set by, for example, double-clicking the mouse with the cursor being on the process information piece of the preferential conditions input column and by this double-clicking, a "process information" screen shown in, for example, FIG. 11 is displayed, through which an operator can set the contents of the process information piece.

The contents of the process information piece may be "application program", "owner of the process", "group of the owner of the process", "priority of the process", "terminal that has started the process", "memory usage of the process", "directory in which the process has been started", and "CPU utilization of the process", and further may include a process ID (process identification) and the ID of a parent process (the process that has created a process) as well as other process attributes.

The "application program" is an item for setting the identification of an application program 800 managed by the operating system 810 as a content of the process information piece. By marking a check in the "application program" item by use of the mouse to select an application program 800 such as database software A, data input/output requests from a process 801 generated by executing the application program 800 are enabled to be transmitted to the storage apparatus 600 with occupying a number of physical paths specified in the process priority table 710.

The "owner of the process" is an item for setting the identification identifying the owner of the process 801 to be identified as a content of the process information piece. The identification identifying the owner of the process 801 is, for example, a user ID entered when logging in the processing apparatus 200. By marking a check in the "owner of the process" item by use of the mouse to select the owner of the process 801, e.g. user A, data input/output requests from the process 801 generated from an application program 800 caused to be executed by the user are enabled to be transmitted to the storage apparatus 600 with occupying a number of physical paths specified in the process priority table 710.

The "group of the owner of the process" is an item for setting the identification identifying the group of the owner of the process 801 as a content of the process information piece. By marking a check in the "group of the owner of the process" item by use of the mouse to select the group of the owner of the process, e.g. group A, data input/output requests from the process 801 generated from an application program 800 caused to be executed by a user belonging to the group are enabled to be transmitted to the storage apparatus 600 with occupying a number of physical paths specified in the process priority table 710.

The "priority of the process" is an item for setting information indicating the priority of the process 801 managed by the operating system 810 as a content of the process information piece. By marking a check in the "priority of the process" item by use of the mouse to enter the priority of the process, e.g. 25 or greater, data input/output requests from a process 801 having a priority equal to or higher than that priority are enabled to be transmitted to the storage apparatus 600 with occupying a number of physical paths specified in the process priority table 710.

The "terminal that has started the process" is an item for setting the identification of the processing apparatus 200 that has generated the process 801 as a content of the process information piece. By marking a check in the "terminal that has started the process" item by use of the mouse to enter the identification of the terminal through which the process has been started, e.g. tty1, data input/output requests from a process 801 started through the terminal are enabled to be transmitted to the storage apparatus 600 with occupying a number of physical paths specified in the process priority table 710.

The "memory usage of the process" is an item for setting information indicating the memory usage of the process 801 as a content of the process information piece. In the example of FIG. 11, data input/output requests from a process 801 of which the memory usage is 10 MB (Mega Byte) or greater are enabled to be transmitted to the storage apparatus 600 with occupying a number of physical paths specified in the process priority table 710.

The "directory in which the process has been started" is an item for setting information indicating the directory in which the process 801 is being executed as a content of the process information piece.

The "CPU utilization of the process" is an item for setting information indicating the CPU utilization of the process 801 as a content of the process information piece. In the example of FIG. 11, data input/output requests from a process 801 of which the CPU utilization is 25% or greater are enabled to be transmitted to the storage apparatus 600 with occupying a number of physical paths specified in the process priority table 710.

Note that a plurality of items can be selected as the contents of the process information piece from the above items. In this case, when selecting, for example, the "application program" and the "memory usage of the process", data input/output requests from the process 801 generated by executing database software A and of which the memory usage is 10 MB (Mega Byte) or greater are enabled to be transmitted to the storage apparatus 600 with occupying a number of physical paths specified in the process priority table 710.

The contents of the process information piece can be set by clicking the mouse with the cursor being on the "OK" button.

Note that the displaying of the "setting of preferential paths" screen and the "process information" screen, and the creation of the preferential path proportion table 730 and the process priority table 710 based on information such as process information pieces entered by an operator or the like are controlled by the process priority table creation section 950.

Priority Management Table

Figure 13:
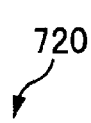
FIG. 13 is a view showing a priority management table according to the embodiment.

When the setting of the path list table 700, the preferential path proportion table 730, and the process priority table 710 is completed, the priority management table creation section 940 creates the priority management table 720 as shown in FIG. 13. The priority management table 720 is a table for storing process information in such a way that each process information piece is associated with information identifying physical paths (second information). Thus, data input/output requests from a process identified by one of the process information pieces listed in the priority management table 720 are transmitted to the storage apparatus 600 with occupying the physical paths associated with the process information piece.

In the example of FIG. 13, based on the preferential path proportion table 730 shown in FIG. 8 and the process priority table 710 shown in FIG. 9, process information C is assigned two physical paths, process information B is assigned three physical paths, and process information A is assigned five physical paths.

Flow of Processing

Figure 14:
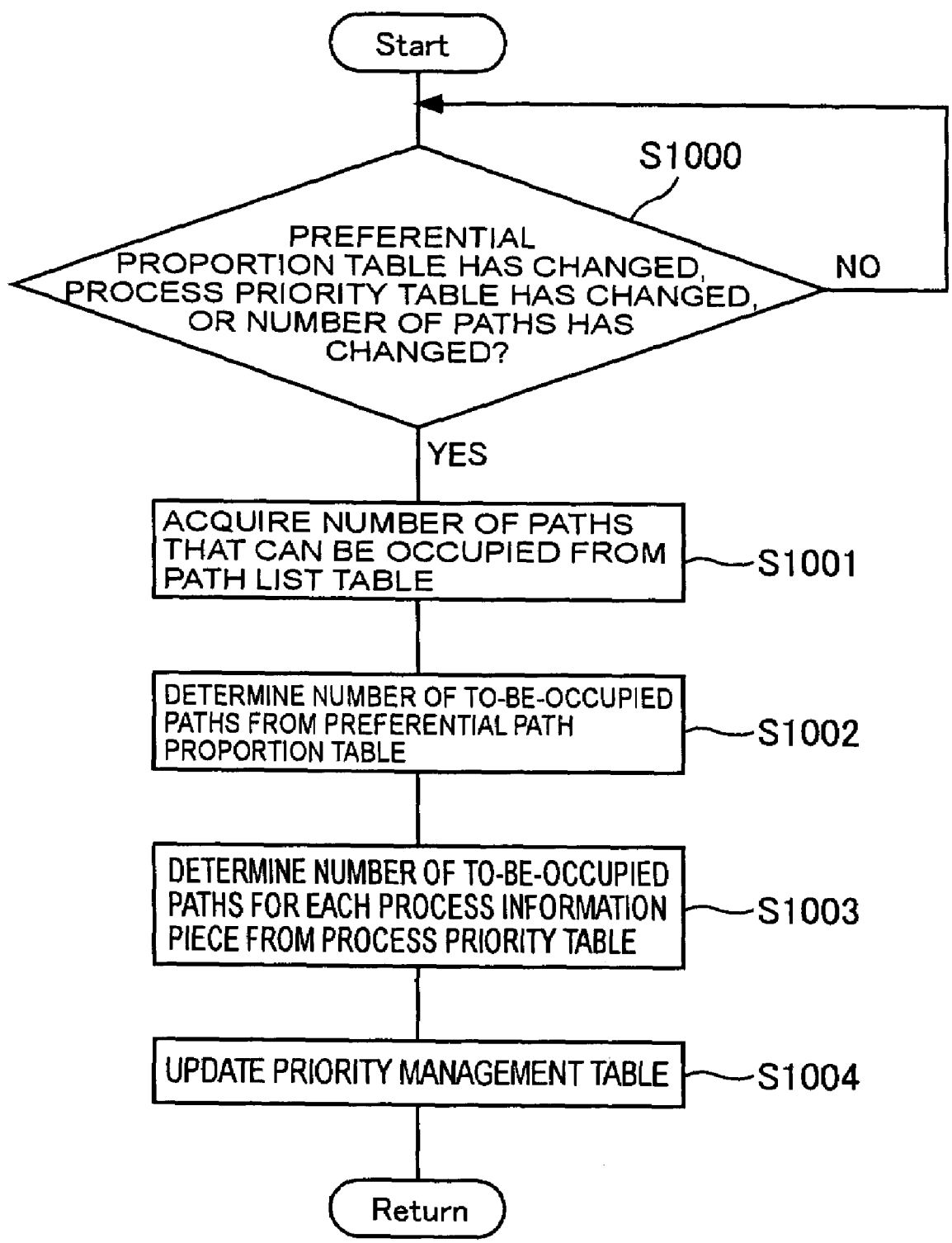
FIG. 14 is a flow chart showing the flow of the process of updating the priority management table according to the embodiment.

The priority management table 720 is updated when the preferential path proportion table 730 or the process priority table 710 has been changed or the number of physical paths has changed. The case where the number of physical paths changes is, for example, the case where a physical path having an anomaly is found and the physical path cannot be used or the case where the physical paths are increased in number. FIG. 14 shows a flow chart of updating the priority management table 720.

When the preferential path proportion table 730 or the process priority table 710 has been changed, or the number of physical paths has changed (S1000), the priority management table creation section 940 acquires the number of physical paths that can be occupied from the path list table 700 (S1001). The physical paths that can be occupied are physical paths that do not share physical-path constituents with other physical paths. The physical paths that can be occupied do not share, for example, an HBA 290 of the processing apparatus 200, an interface controller 110 of the storage apparatus 600, or a communication cable 510 with other physical paths. Because the logical paths listed in the path list table 700 originally do not share physical-path constituents with each other, each of the logical paths is a physical path that can be occupied. Hence, the number of physical paths that can be occupied is twenty.

After acquiring the number of physical paths that can be occupied, the number of preferential paths is determined according to the proportion of the number of preferential paths to the number of normal paths specified in the preferential path proportion table 730 (S1002). The number of preferential paths is determined to be ten from the preferential path proportion table 730 of FIG. 8.

Subsequently, according to the proportion of the number of preferential paths for each process information piece specified in the process priority table 710, the number of preferential paths for the process information piece is determined (S1003). When ten preferential paths are assigned in the proportion 5:3:2, the number of physical paths occupied when transmitting data input/output requests generated by a process identified by process information A is determined to be five; the number of physical paths occupied when transmitting data input/output requests generated by a process identified by process information. B is determined to be three; and the number of physical paths occupied when transmitting data input/output requests generated by a process identified by process information C is determined to be two.

Then, the priority management table 720 is updated in such a way that each process information piece is associated with a number of preferential paths according to the proportion of the number of preferential paths for the process information piece (S1004). In associating the process information piece with preferential paths, any combination can be made.

Note that in the present embodiment, even when a physical path having an anomaly is found, the number of preferential paths is updated depending on the number of physical paths other than the physical path having an anomaly.

Furthermore, a "path occupation flag" column of the priority management table 720 is set at 1 when data input/output requests generated by a process identified by a process information piece are enabled to occupy the preferential path or otherwise at zero.

Moreover, the process of newly creating the priority management table 720 is performed by executing steps S1001 through S1004 of the flow chart shown in FIG. 14.

Figure 15:
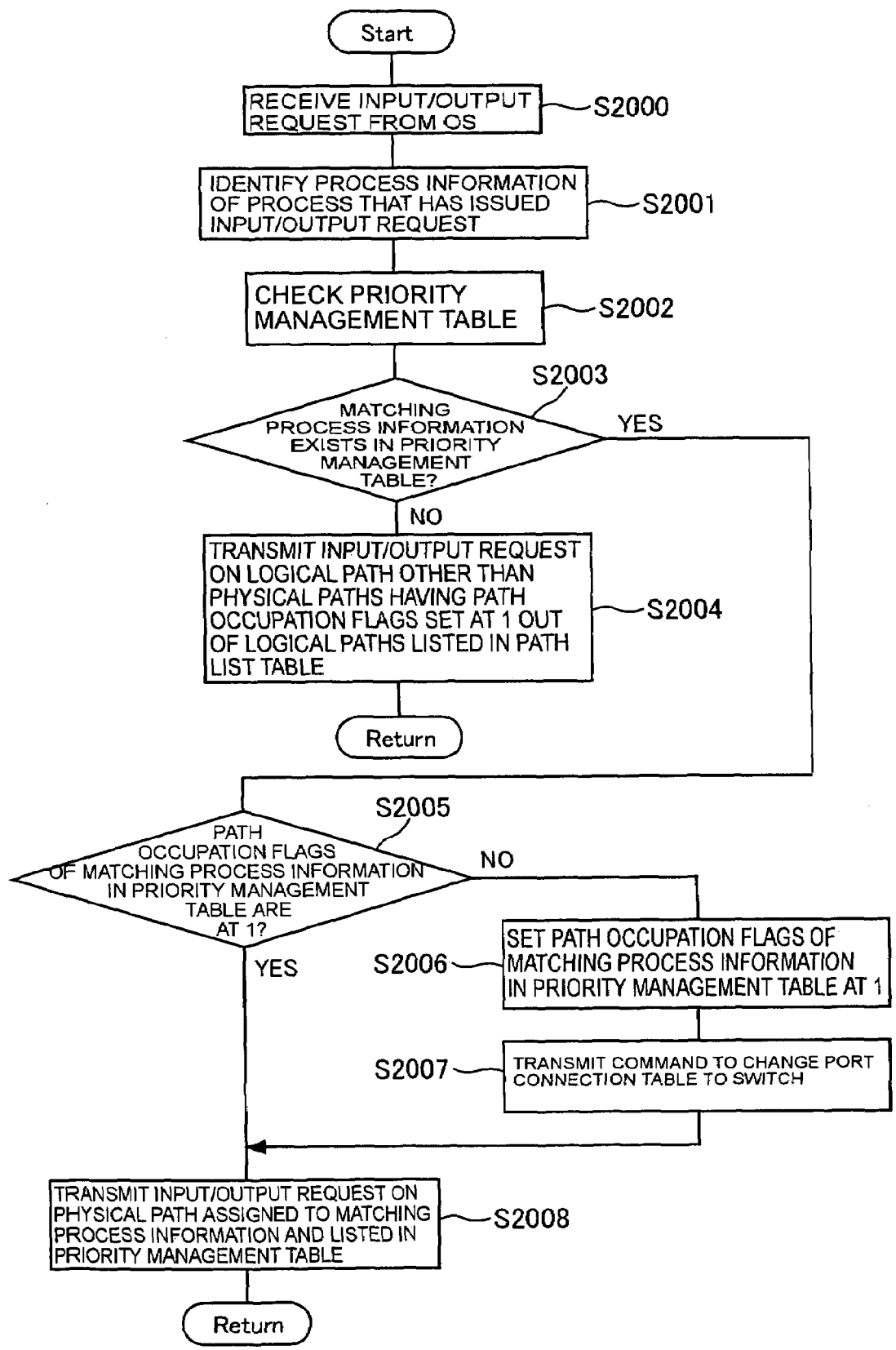
FIG. 15 is a flow chart showing the flow of a data input/output process according to the embodiment.

Next, the process flow where data input/output requests are being transmitted to the storage apparatus 600 due to the execution of an application program 800 will be explained with reference to the flow chart shown in FIG. 15.

First, when the input/output controller 910 has received a request for transmission of a data input/output request from the operating system 810 (S2000), the process determining section 920 identifies the process information of the process 801 that has issued the data input/output request (S2001). The identifying of the process information can be performed, for example, by inquiring of the operating system 810.

Then, the interface selector 930 checks whether a process information piece matching the process information of the process 801 that has issued the data input/output request exists in the priority management table 720 (S2002), and if a matching process information piece exists (if the data input/output request to be transmitted to the storage apparatus 600 is a first data input/output request generated by a process 801 identified by first information about attributes), the answer to the check is Yes (S2003). Then, when the path occupation flags for the process information piece in the priority management table 720 are at 1 (S2005), data input/output requests generated by a process 801 having matching process information can occupy the preferential paths, and hence, the answer to the check is Yes, and the data input/output request is registered in one of the input/output queues 221 corresponding to the preferential paths (S2008). By this means, data input/output requests generated by the process 801 having matching process information (first data input/output requests) can be transmitted to the storage apparatus 600 via a number of preferential paths associated with the process information piece (first physical paths identified by the second information associated with the first information). Here, when there are a plurality of preferential paths associated with the process information piece, data input/output requests may be transmitted to the storage apparatus 600 in a round-robin among those preferential paths. That is, data input/output requests may be transmitted to the storage apparatus 600 using the preferential paths in turn. Thereby, load dispersion among the preferential paths becomes possible.

In contrast, when the path occupation flags for the process information piece of the priority management table 720 are at zero (S2005), data input/output requests generated by the process 801 having matching process information are not enabled to occupy the preferential paths, and hence, the answer to the check is No. Then, the path occupation flags for the process information piece are set at 1 thereby putting the preferential paths in an able-to-be-occupied state (S2006). When the processing apparatus 200 and the storage apparatus 600 are coupled via a switch 500 as described later in detail, a command to change a port connection table 506 is sent to the switch 500 (S2007), and then, the data input/output request is registered in one of the input/output queues 221 corresponding to the preferential paths (S2008). By this means, when data input/output requests to be transmitted to the storage apparatus 600 are data input/output requests generated by a process 801 having process information matching a process information piece in the priority management table 720, control can be changed from first control where a plurality of data input/output requests are transmitted to the storage apparatus 600 using the physical paths in turn to second control where data input/output requests generated by a process 801 having process information matching the process information piece are transmitted to the storage apparatus 600 with occupying the preferential paths.

Note that when the processing apparatus 200 and the storage apparatus 600 are directly coupled by the communication cables 510 without the switch 500, the process of step S2007 is not performed. The case when the processing apparatus 200 and the storage apparatus 600 are coupled via the switch 500 will be described later.

In contrast, in step S2003, if a process information piece matching the process information of the process 801 that has issued the data input/output request does not exist in the priority management table 720 (if the data input/output request is a second data input/output request generated by a process 801 not identified by the first information), the answer to the check is No (S2003). In this case, data input/output requests cannot be transmitted using preferential paths. Data input/output requests are transmitted to the storage apparatus 600 via logical paths other than the physical paths having their path occupation flags in the priority management table 720 set at 1 from among the logical paths listed in the path list table 700 (S2004).

Because data input/output requests are transmitted to the storage apparatus 600 via logical paths other than the physical paths having their path occupation flags in the priority management table 720 set at 1, data input/output requests can be transmitted to the storage apparatus 600 via physical paths other than the preferential paths, that is, normal paths.

Here, as shown in, e.g., FIG. 12, when there are a plurality of normal paths, data input/output requests may be transmitted to the storage apparatus 600 in a round-robin among those normal paths. That is, data input/output requests can be transmitted to the storage apparatus 600 using the normal paths in turn. Thereby, load dispersion among the normal paths becomes possible.

Furthermore, by arranging data input/output requests to be transmitted to the storage apparatus 600 via logical paths other than the physical paths having their path occupation flag in the priority management table 720 set at 1, even physical paths assigned as preferential paths can be used for transmitting other data input/output requests while there are no data input/output requests to be transmitted occupying the preferential paths.

Figure 18:
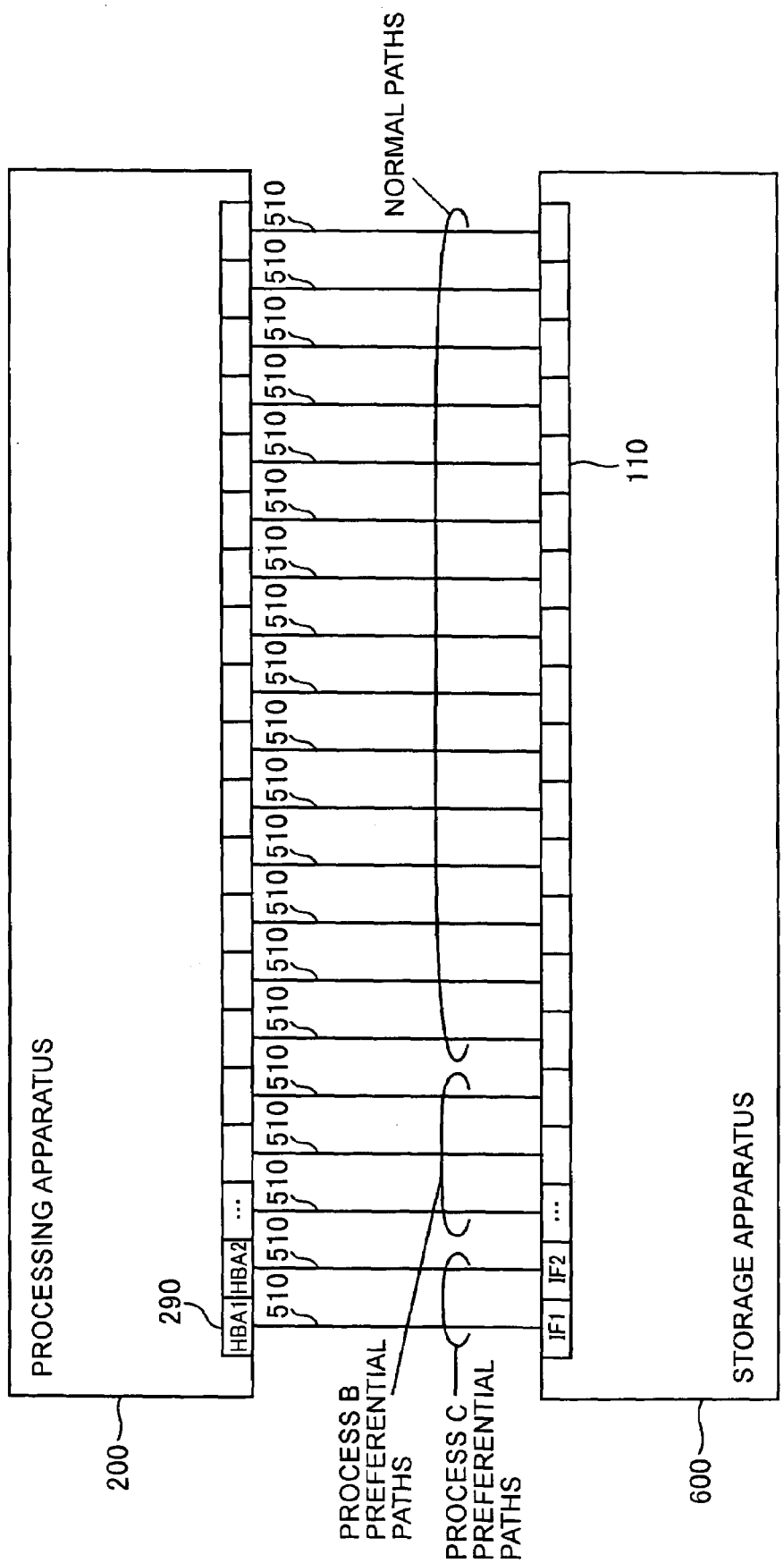
FIG. 18 is a view showing a state of paths according to the embodiment.

Such a state is shown in FIG. 18. FIG. 18 shows the state where, when the path occupation flags corresponding to process information A are at zero, physical paths to be occupied when transmitting data input/output request generated by a process identified by process information A are used for transmitting data input/output requests from other processes. By this means, the physical paths between the processing apparatus 200 and the storage apparatus 600 can be utilized effectively without waste, and thereby data input/output performance can be improved.

Figure 17:
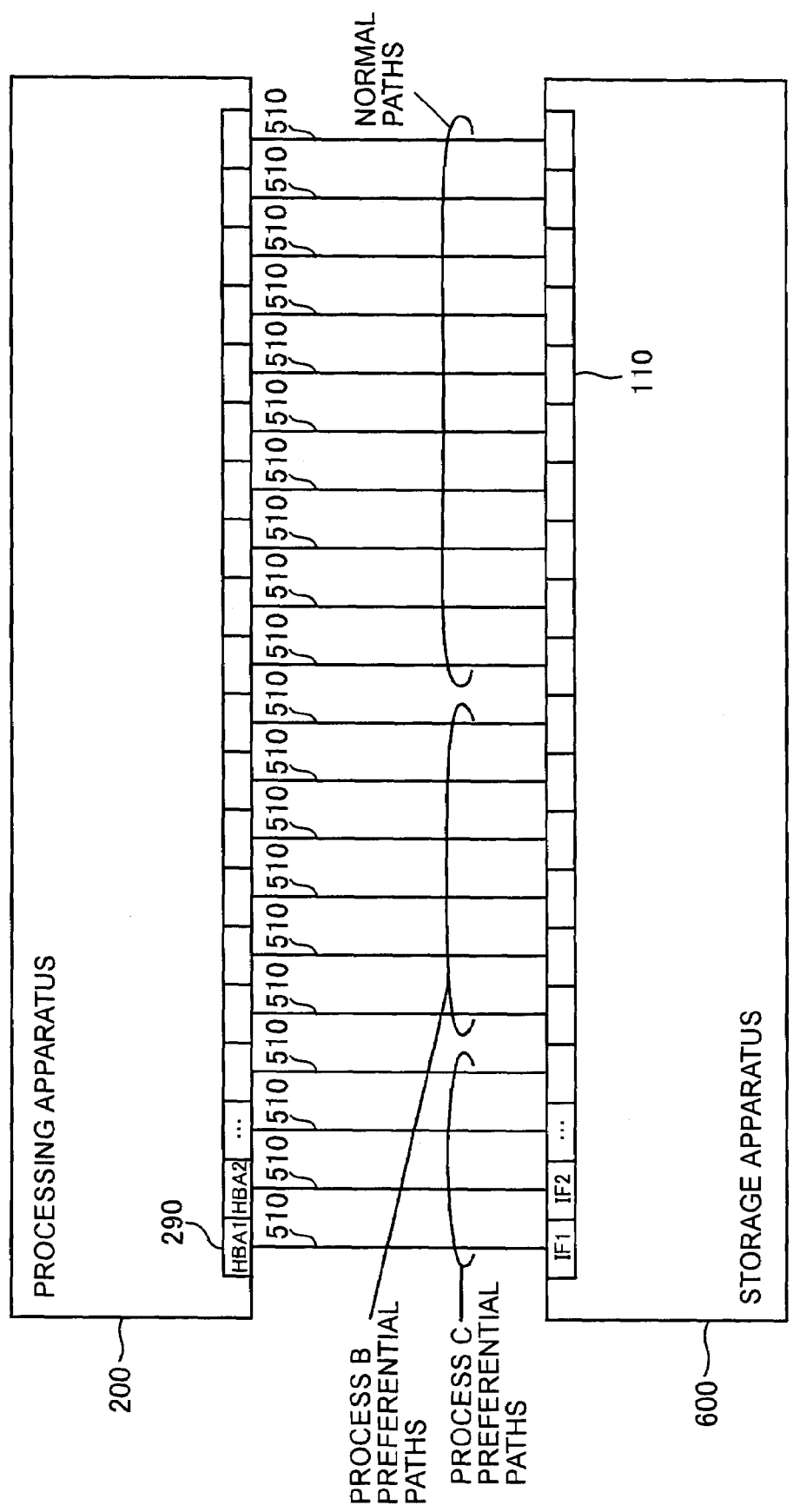
FIG. 17 is a view showing a state of paths according to the embodiment.

Note that as shown in FIG. 17, when the path occupation flags corresponding to process information A are at zero, physical paths to be occupied when transmitting data input/output request generated by a process identified by process information A can be assigned as preferential paths for other process information pieces. By this means, data input/output requests from a process 801 having process information matching a process information piece listed in the priority management table 720 can be transmitted at higher speed.

Next, the process of setting the path occupation flags corresponding to a process information piece at zero will be explained with reference to the flow chart shown in FIG. 16.

Figure 16:
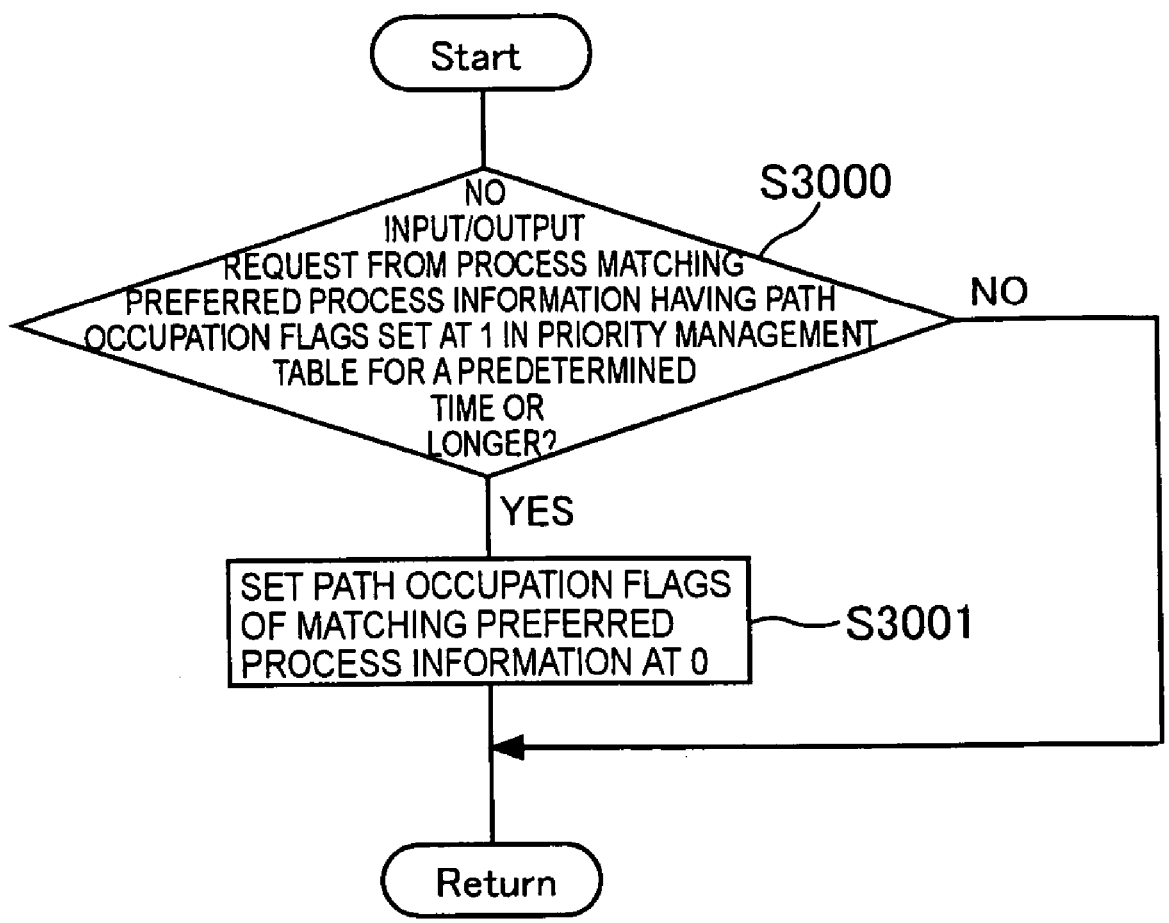
FIG. 16 is a flow chart showing the flow of the process of setting a path occupation flag at zero according to the embodiment.

As shown in FIG. 16, if there are no data input/output requests from a process having process information matching a process information piece for which the path occupation flags are at 1 in the priority management table 720 for a predetermined time period or longer (S3000), the path occupation flags are set at zero in the priority management table 720 (S3001). By this means, their preferential paths can be used for transmitting data input/output requests from other processes.

Case where the Processing Apparatus and the Storage Apparatus are Coupled via a Switch Next, the case where the processing apparatus 200 and the storage apparatus 600 are coupled via a switch 500 will be explained with reference to an exemplary configuration shown in FIG. 19.

Figure 19:
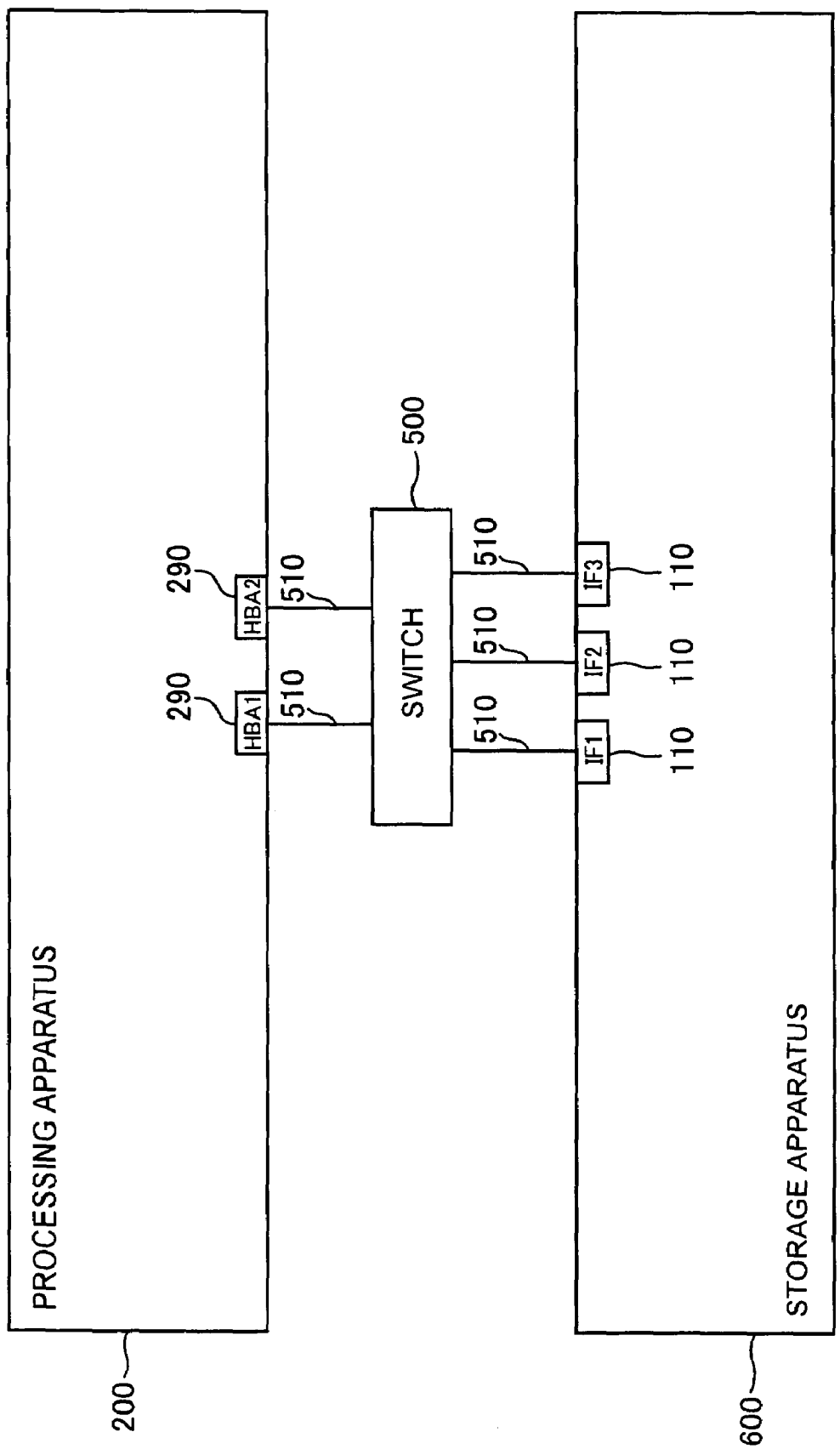
FIG. 19 is a block diagram showing the configuration where a processing apparatus and a storage apparatus are coupled via a switch according to the embodiment.

In the example of FIG. 19, the processing apparatus 200 and the switch 500 are connected by two communication cables 510, and the storage apparatus 600 and the switch 500 are connected by three communication cables 510. In this case, the number of logical paths between the processing apparatus 200 and the storage apparatus 600 is six as shown in the path list table 700 of FIG. 20.

In this case, assuming that the preferential path proportion table 730 and the process priority table 710 are set as shown in FIGS. 8 and 9 respectively, then the priority management table 720 is set as shown in FIG. 21. The procedure of creating the priority management table 720 will be explained below.

First, the priority management table creation section 940 acquires the number of physical paths that can be occupied from the path list table 700. Here, as mentioned above, the physical paths that can be occupied are physical paths that do not share physical-path constituents with other physical paths. Thus, the number of physical paths that can be occupied is two. This is because the processing apparatus 200 has only two HBAs 290 and the number of communication cables 510 connecting the processing apparatus 200 and the switch 500 is two.

After acquiring the number of physical paths that can be occupied, the number of preferential paths is determined referring to the preferential path proportion table 730. Because the proportion of the number of preferential paths to the number of normal paths specified in the preferential path proportion table 730 of FIG. 8 is of 10 to 10, the number of preferential paths is determined to be one.

Subsequently, according to the process priority table 710, the number of preferential paths for each process information piece is determined. Here, it is specified in the process priority table 710 that the number of physical paths occupied when transmitting data input/output requests generated by a process identified by process information A is five, that the number of physical paths occupied when transmitting data input/output requests generated by a process identified by process information B is three, and that the number of physical paths occupied when transmitting data input/output requests generated by a process identified by process information C is two, but there is only one physical path that can be occupied. Hence, process information A, for which the number of physical paths to be occupied is greatest, is made to be associated with the physical path. Then, the priority management table 720 shown in FIG. 21 is created. Note that a physical path to be associated with a process information piece can be selected arbitrarily. In the example of FIG. 21, the physical path identified by HBA1 (290) and IF1 (110) has been selected.

Next, the scheme with which a physical path between the processing apparatus 200 and the storage apparatus 600 coupled via the switch 500 is occupied will be explained with reference to FIGS. 22 to 24.

Figure 22:
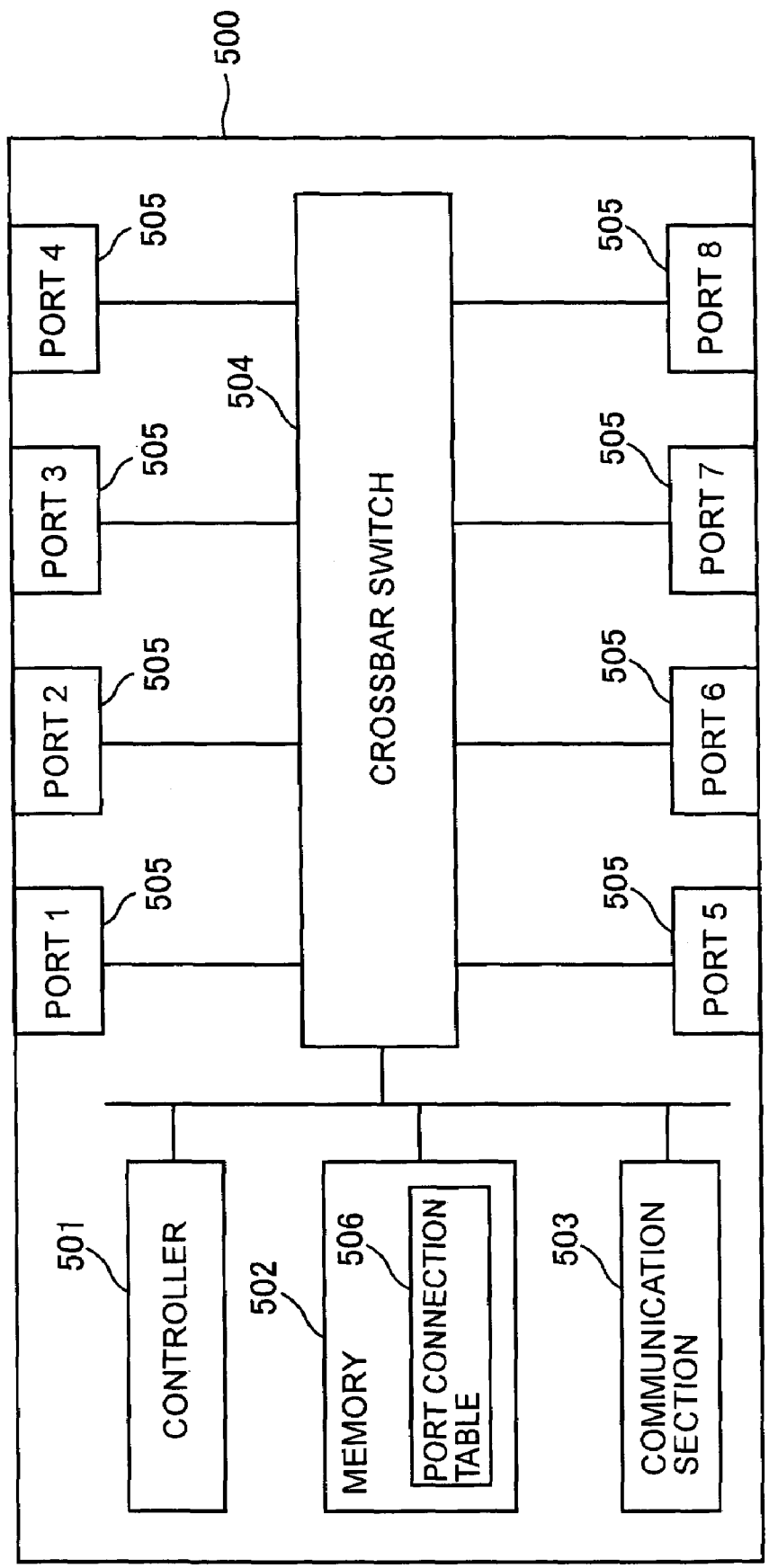
FIG. 22 is a block diagram showing the configuration of the switch according to the embodiment.

FIG. 22 shows a block diagram of the internal configuration of the switch 500. The switch 500 comprises a plurality of ports (third communication ports) 505. Each port 505 is connected one-on-one to an HBA 290 of the processing apparatus 200 and an interface controller 110 of the storage apparatus 600. The ports 505 are connected to each other by a crossbar switch 504 in the switch 500. The switch of FIG. 22 has eight ports 505. The connection between the ports 505 can be changed by changing the setting of the crossbar switch 504. The setting of the crossbar switch 504 can be performed by setting a port connection table 506 stored in memory 502.

Figures 23, 24:
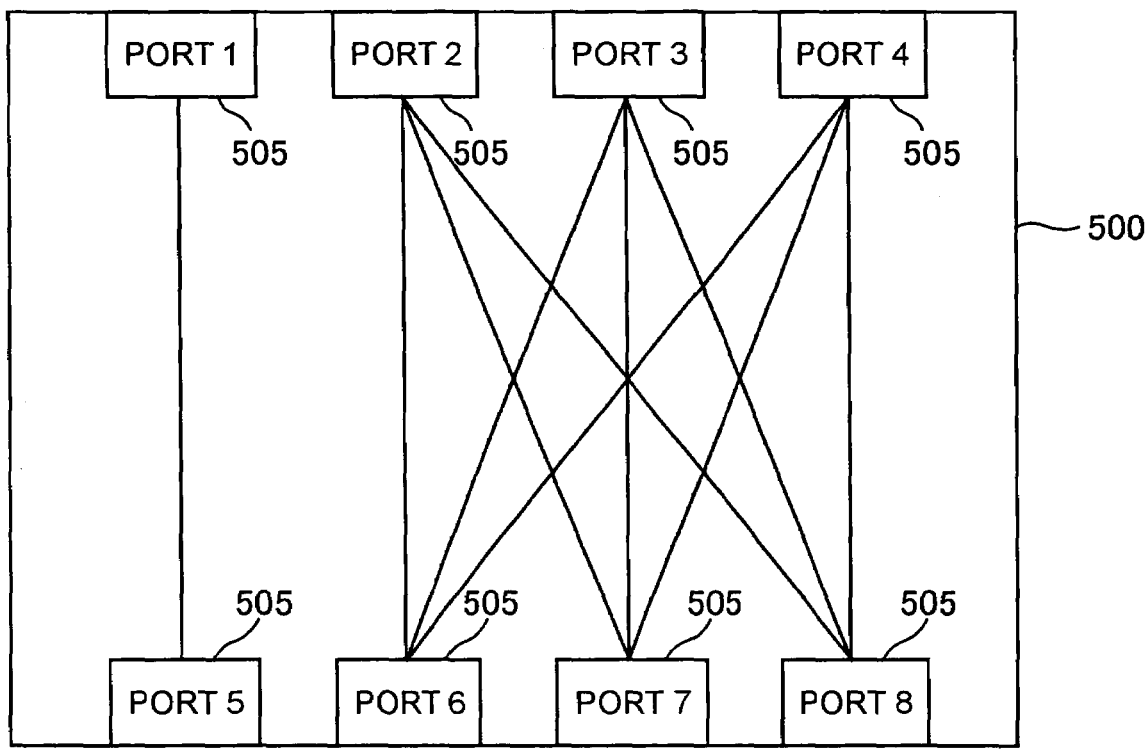
FIG. 23 is a view showing a port connection table according to the embodiment.
FIG. 24 is a view showing a state of ports connected according to the port connection table according to the embodiment.

FIG. 23 shows an example of the port connection table 506. The port connection table 506 of FIG. 23 designates, for each port 505, ports 505 that can output data inputted through it. It is shown that data inputted through each port 505 can be output from ports 505, indicated by a "circle" symbol. For example, when data is inputted through port 5 (505), the data can be output from port 1 (505), and when data is inputted through port 2 (505), the data can be output from port 6 (505), port 7 (505), and port 8 (505). The port connection table 506 shown in FIG. 23 indicates that each port 505 is connected to others as shown in FIG. 24.

In this case, when an HBA 290 of the processing apparatus 200 and port 1 (505) are connected one-on-one, and an interface controller 110 of the storage apparatus 600 and port 5 (505) are connected one-on-one, the processing apparatus 200 can transmit data input/output requests with occupying a physical path by transmitting them through port 1 (505) and port 5 (505) of the switch 500 to the storage apparatus 600.

By setting the port connection table 506 in this manner, data input/output requests can be transmitted with occupying a physical path between the processing apparatus 200 and the storage apparatus 600 coupled via the switch 500. The setting of the port connection table 506 can be performed by transmitting a command to change the port connection table 506 from the processing apparatus 200 as explained in S2007 of the flow chart of FIG. 15.

A communication section 503 provided in the switch 500 is a device for communicating. The communication section 503 is connected via, for example, LAN 400 to the processing apparatus 200, the management terminal 201, and the storage apparatus 600. And the communication section 503 receives a command to change the port connection table 506 from the processing apparatus 200.

A controller 501 provided in the switch 500 controls the entire operation of the switch 500 including, for example, communication performed via the port 505 between the processing apparatus 200 and the storage apparatus 600. Also, the controller 501 changes the port connection table 506 according to a command to change the port connection table 506.

According to the present embodiment described above, taking into account attributes possessed by the process 801, specific data input/output requests having high priority can be transmitted from the processing apparatus 200 to the storage apparatus 600 with occupying physical paths. Thus, without being affected by other data input/output requests, the specific data input/output requests can be transmitted to the storage apparatus 600.

Although the preferred embodiment of the present invention has been described, the embodiment described above is provided to facilitate the understanding of the present invention and not intended to limit the present invention. It should be understood that various changes and alterations can be made therein without departing from the spirit and scope of the present invention and that the present invention includes equivalents thereof.

What is claimed is:

1. A processing apparatus which is coupled to a storage apparatus via a plurality of physical paths as transmission paths for a plurality of data input/output requests to be transmitted to the storage apparatus, the transmission occurring in association with the execution of an application program managed as a process by an operating system, the processing apparatus comprising:

a CPU;

a memory;

an association storage section implemented by the CPU executing a program stored in the memory;

a transmission controller implemented by the CPU executing a program stored in the memory; and a physical path proportion storage section implemented by the CPU executing a program stored in the memory, wherein the association storage section stores a first information piece about attributes identifying a specific process generating data input/output requests in such a manner that the first information piece is associated with a second information piece identifying at least one of the physical paths as at least one first physical path, and wherein when transmitting first data input/output requests generated by the process identified by the first information piece to the storage apparatus, the transmission controller transmits the first data input/output requests to the storage apparatus via the first physical path identified by the second information piece associated with the first information piece and, when transmitting second data input/output requests generated by a process not identified by the first information piece to the storage apparatus, transmits the second data input/output requests to the storage apparatus via at least one second physical path different from the first physical path of the plurality of physical paths, wherein the physical path proportion storage section stores the proportion of the number of physical paths used as the first physical paths to the number of physical paths used as the second physical paths, and the association storage section stores the first information piece in such a manner that the first information piece is associated with a second information piece identifying a number, according to the proportion, of the first physical paths, and wherein when at least some of the data input/output requests to be transmitted to the storage apparatus are the first data input/output requests, the transmission controller transmits the first data input/output requests to the storage apparatus via a number, assigned according to the proportion, of the first physical paths, and transmits the second data input/output requests to the storage apparatus via a number, assigned according to the proportion, of the second physical paths.

2. A processing apparatus according to claim 1, wherein when it is found that at least one physical path has an anomaly, the association storage section updates the number of the first physical paths identified by the second information piece associated with the first information piece according to the number of the physical paths except the at least one physical path found to have an anomaly.

3. A processing apparatus according to claim 1, wherein the association storage section stores a plurality of the first information piece in such a manner that each the first information piece is associated with a second information piece identifying physical paths, and wherein when transmitting first data input/output requests generated by the process identified by one of the plurality of first information pieces to the storage apparatus, the transmission controller transmits the first data input/output requests to the storage apparatus via the first physical path identified by the second information piece associated with the one first information piece and, when transmitting second data input/output -requests generated by a process not identified by the plurality of first information pieces to the storage apparatus, the transmission controller transmits the second data input/output requests to the storage apparatus via the at least one second physical path.

4. A processing apparatus according to claim 1, wherein the plurality of physical paths are formed by connecting a plurality of first communication ports of the processing apparatus and a plurality of second communication ports of the storage apparatus one-on-one to a plurality of third communication ports of a switch having the plurality of third communication ports.

5. A processing apparatus according to claim 1, wherein the attributes of the process include at least one of an identification of the process identification of the application program managed as the process by the operating system, an identification identifying the owner of the process, an identification identifying the group of the owner of the process, information indicating execution priority of the process managed by the operating system, an identification of the processing apparatus in which the process has been created, information indicating utilization of the CPU by the process, information indicating usage of the memory by the process, information indicating the directory in which the process is being executed, and an identification of the parent process that has created the process.

6. A control method for a processing apparatus which is coupled to a storage apparatus via a plurality of physical paths as transmission paths for a plurality of data input/output requests to be transmitted to the storage apparatus, the transmission occurring in association with the execution of an application program managed as a process by an operating system, the processing apparatus comprising a CPU; a memory; an association storage section implemented by the CPU executing a program stored in the memory; and a transmission controller implemented by the CPU executing a program stored in the memory; the control method comprising:

storing by the association storage section stores a first information piece about attributes identifying a specific process generating data input/output requests in such a manner that the first information piece is associated with a second information piece identifying at least one of the physical paths as at least one first physical path;

when transmitting first data input/output requests generated by the process identified by the first information piece to the storage apparatus, transmitting the transmission controller transmits the first data input/output requests to the storage apparatus via the first physical path identified by the second information piece associated with the first information piece;

when transmitting second data input/output requests generated by a process not identified by the first information piece to the storage apparatus, transmitting the transmission controller transmits the second data input/output requests to the storage apparatus via at least one second physical path different from the first physical path of the plurality of physical paths;

storing, by a physical path proportion storage section implemented by the CPU executing a program stored in the memory, the proportion of the number of physical paths used as the first physical paths to the number of physical paths used as the second physical paths;

storing, by the association storage section, the first information piece in such a manner that the first information piece is associated with a second information piece identifying a number, according to the proportion, of the first physical paths; and when at least some of the data input/output requests to be transmitted to the storage apparatus are the first data input/output requests, transmitting the first data input/output requests to the storage apparatus via a number, assigned according to the proportion, of the first physical paths, and transmitting the second data input/output requests to the storage apparatus via a number, assigned according to the proportion, of the second physical paths.

7. A control method according to claim 6, further comprising:

when it is found that at least one physical path has an anomaly, updating by the association storage section the number of the first physical paths identified by the second information piece associated with the first information piece according to the number of the physical paths except the at least one physical path found to have an anomaly.

8. A computer readable storage medium storing a computer software program for a processing apparatus which is coupled to a storage apparatus via a plurality of physical paths as transmission paths for a plurality of data input/output requests to be transmitted to the storage apparatus, the transmission occurring in association with the execution of an application program managed as a process by an operating system, the computer software program comprising:

to store code for storing a first information piece about attributes identifying a specific process generating data input/output requests in such a manner that the first information piece is associated with a second information piece identifying at least one of the physical paths as at least one first physical path;

code for, when transmitting first data input/output requests generated by the process identified by the first information piece to the storage apparatus, to transmit transmitting the first data input/output requests to the storage apparatus via the first physical path identified by the second information piece associated with the first information piece;

code for, when transmitting second data input/output requests generated by a process not identified by the first information piece to the storage apparatus, to transmit transmitting the second data input/output requests to the storage apparatus via at least one second physical path different from the first physical path of the plurality of physical paths;

code for storing the proportion of the number of physical paths used as the first physical paths to the number of physical paths used as the second physical paths;

code for storing the first information piece in such a manner that the first information piece is associated with a second information piece identifying a number, according to the proportion, of the first physical paths; and code for, when at least some of the data input/output requests to be transmitted to the storage apparatus are the first data input/output requests, transmitting the first data input/output requests to the storage apparatus via a number, assigned according to the proportion, of the first physical paths, and transmitting the second data input/output requests to the storage apparatus via a number, assigned according to the proportion, of the second physical paths.

9. A computer readable storage medium according to claim 8, further comprising:

code for, when it is found that at least one physical path has an anomaly, updating by the association storage section the number of the first physical paths identified by the second information piece associated with the first information piece according to the number of the physical paths except the at least one physical path found to have an anomaly.

* * * * *